United States Patent

Darnell et al.

[11] Patent Number: 5,183,566
[45] Date of Patent: Feb. 2, 1993

[54] HOLLOW FIBER MODULE BUILT UP FROM CONCENTRIC CYLINDERS OF HOLLOW FIBERS

[75] Inventors: Charles F. Darnell, Baton Rouge, La.; Mahmoud M. Hafez, Bright's Grove, Canada

[73] Assignee: Exxon Research and Engineering Company, Florham Park, N.J.

[21] Appl. No.: 732,256

[22] Filed: Jul. 18, 1991

Related U.S. Application Data

[63] Continuation of Ser. No. 430,225, Nov. 1, 1989, abandoned.

[51] Int. Cl.$^5$ .............................................. B01D 69/08
[52] U.S. Cl. .......................... 210/321.8; 210/321.89; 210/450; 210/500.23
[58] Field of Search ................ 210/450, 500.23, 321.8, 210/321.89

[56] References Cited

U.S. PATENT DOCUMENTS 4,172,794 10/1979 Sigdell et al. ............. 210/500.23 X
4,911,846 3/1990 Akasu et al. ............... 210/500.23 X Primary Examiner—Frank Spear
Attorney, Agent, or Firm—Joseph J. Allocca

[57] ABSTRACT

A method for producing large diameter hollow fiber membrane modules and the modules made by the method are disclosed. The method involves the production of sub assemblies comprising a central assembly and a number of concentric ring assemblies which fit around each other and the central assemble. These sub assemblies, when fitted together can then be potted or glued and permitted to set.

9 Claims, 2 Drawing Sheets

HOLLOW FIBER MODULE BUILT UP FROM CONCENTRIC CYLINDERS OF HOLLOW FIBERS

This is a continuation of application Ser. No. 430,225, filed Nov. 1, 1989, now abandoned.

DESCRIPTION OF THE INVENTION

A large diameter module of hollow fibers is prepared by fabricating a number of subassemblies comprising a central assembly and a number of concentric, increasing diameter cylinder assemblies of hollow fibers, each cylinder assembly in the series fitting around the next smaller cylinder assembly and inside the next larger cylinder assembly, this entire array of assemblies fitting around the central core assembly. Once all the sub assemblies have been fitted into each other and inserted into a housing, the end space between the concentric cylinders is sealed with glue and a completed element is obtained.

BACKGROUND OF THE INVENTION

Figure 1:
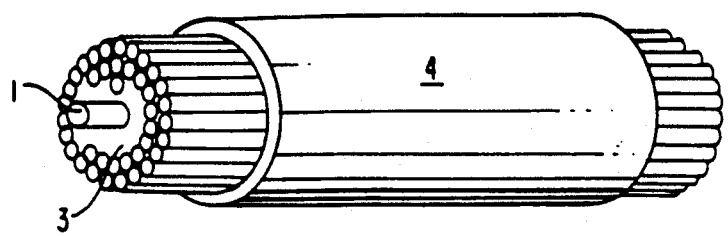
FIGS. 1, 1A and 1B are schematics in three views showing the central core assembly.

Modules of hollow fiber, potted on the ends to define an element have typically been fabricated by inserting a central mandrel perforated with a number of holes into the center of a vessel, which is itself fitted with inlet/outlet means, inserting a multitude of hollow fiber into the vessel in parallel with the central mandrel, the hollow fibers extending beyond the ends of the vessel and adding potting material only around the ends of the hollow fibers in the area defined by the open bore of the vessel thereby forming a collar of potting material defining an interior zone within the vessel which is isolated from the exterior of the vessel. Modules of this general design are described in U.S. Pat. No. 3,228,876.

A disadvantage of these modules, however, when one attempts to produce a module of very large diameter, is the large amount of potting material which must be positioned around the ends of the hollow fibers and in the bore of the large diameter vessel. The large amount of potting material presents a handling problem in and of itself insofar as clearly positioning it around the ends of the fibers and in the ends of the bore area only of the large diameter vessel is concerned. Beyond that, the use of a large amount of potting material is accompanied by a materials problem. Typically, the potting material is a thermoset epoxy. During curing a large amount of heat is produced which is not easily dissipated. Further, the epoxy expands and contracts during curing resulting in cracks in the potting material itself as well as areas at which the potting material has pulled away from the walls of the large diameter vessel and/or pulled away from the hollow fibers. Such defects, as is readily apparent, compromise the integrity of the module and in the extreme, if corrections and repairs cannot be implemented, in the module being rejected as defective.

It would be a major advance if large diameter modules of hollow fibers could be prepared which overcome or minimize the problems associated with dealing with the sealing of large diameter opening and with curing large amounts of potting material.

THE PRESENT INVENTION

Large diameter modules of hollow fibers and a method for their production are described.

The large diameter module is prepared from a number of sub assemblies. The sub assemblies comprise a center assembly comprising a hollow central mandrel perforated with openings, which can function either as feed entrance means or permeate exit means, a multitude of hollow fibers extending parallel to the central mandrel, a ring/collar of potting material at the ends of, but which does not intrude into the center of, the hollow fibers and in contact with the central mandrel and an overwrap of generally permeable material which does not extend to the ends of the assembly producing a generally cylindrical sub assembly, and at least one larger diameter cylinder assembly generally equal in length to the center assembly. This outer large diameter assembly comprises a large diameter permeable or perforated central tube at least as wide in internal diameter as the exterior/outside diameter of the aforesaid central sub assembly and generally as long as said central sub assembly. Around this large diameter permeable or perforated central tube is arranged a multitude of hollow fibers parallel to said central tube. The bundle of hollow fibers located around the central tube is uniformly distributed around the central tube and extends some inches in depth around the central tube. This assembly is likewise potted around its end edges on the outside of the central tube thereby forming a circular ring/collar of potting material, in which are embedded the ends of the hollow fibers, but which does not intrude into the inner bore of the hollow fibers. This ring/collar encompasses the end of the central tube. This assembly is also wrapped with an overwrap of mesh or porous material which does not extend to the ends of the assembly to form a generally cylindrical exterior surface, the sub assembly defining, generally, a ring in cross section perpendicular to its longitudinal axis. This sub assembly is just wide enough in exterior diameter to just fit into the inner bore of another, similar, yet larger central tube/potted hollow fiber sub assembly or just wide enough in internal diameter to fit into a pressure vessel fitted with exit/entrance means and optionally manifold at the ends with the manifold also being fitted with exit/entrance means. All of these sub assemblies and generally equal in length for ease in fabricating the final module and insuring integrity of the end seals.

The porous overwrap does not extend to the ends of the assembly because to do so would compromise the fluid tight integrity which must exist between the interior and exterior zones created by the hollow fibers. By not extending to the edge a ledge is created. When the sub assemblies are fitted into each other the ledge creates a gap between adjacent sub assemblies at the ends. The gap is filled with adhesive when the various sub assemblies are combined and fluid integrity is thereby maintained between an exterior zone on the outside of the hollow fiber and an interior zone defined by the inside of the hollow fibers and extending into the manifolded zone (to be described in detail later) at the ends of the vessel housing the module.

The concentric ring hollow fiber module is produced by fitting the central assembly into the next larger diameter assembly which itself is fitted into the next larger diameter assembly, etc. until the completed sub assembly array is fitted into an exterior vessel fitted with entrance/exit means. The potted ends are glued at their interfaces with each other using an appropriate adhesive introduced into the gap space at the potted end interface created because the porous overwraps do not extend to the ends of the assemblies. The gap so created makes it easy to introduce adhesives into the seams between the assemblies yet prevents the adhesive from moving too far down the space between the assemblies. The adhesive used is conveniently more of the same potting material. Because each sub assembly is individually potted any expansion/contraction defects which may occur are relatively minor and easily repaired. Sub assemblies with major defects are discarded but without the need of discarding an entire module. Each sub assembly cures separately and then the sub assemblies are fitted into each other according to size. The final seams between sub assemblies are relatively small and easily filled. The small amount of sealant material used cures relatively evenly with a minimum of thermal expansion/contraction during curing. Manifold means can be fitted to the ends of the exterior vessel into which the final assembly is inserted thereby helping to define the interior and exterior zones created by the hollow fiber and keeping such zones isolated and not in direct fluid communication.

Using this technique a module of any diameter can be fabricated. Modules from as small as 8 inches or less in diameter can be prepared using the technique employing a central assemble of 2-5 inches (as appropriate, taking into account the final module diameter) and an outer cylinder assemble accounting for the balance of the element diameter. Similarly, modules 30 or more inches in diameter can be prepared, again starting with a central assembly of, for example, 3-5 inches and a multitude of concentric cylinder sub assemblies which fit in size order around the central assemble and into and around each other until a final assembly of the desired diameter is obtained, after which the seams between each sub assembly and the outer vessel are glued, end manifolds are fitted if desired, and the final module is ready for use.

In practice, when a multitude of concentric cylinder sub assemblies are used, they can all be fitted into each other first then all the gaps or seems between assemblies glued at one time or in sequence. Alternatively the sub assemblies can be fitted into each other, in ascending or descending size order, in a sequential manner, e.g. a first larger diameter sub assembly is fitted around the central assembly and glued at the gap or seam to form a new assembly fitted into a yet larger diameter bore concentric cylinder assembly, and glued, which is then fitted into yet a larger concentric cylinder assembly etc. until the final assembly of desired diameter is fitted into the exterior vessel and glued in place followed by addition of vessel end manifold means, if desired. The perforated central mandrel and the porous, larger diameter tubes can be smooth walled or can have one or more vanes, baffles or fins extending radially from the external, outer walls along the longitudinal length of all or only a few of the mandrel and tubes making up the module, thus producing a "finned" configuration. These vanes, baffles or fins can be solid or porous/perforated and function as interruptors to prevent channeling in the flow of fluid in the hollow fiber module around the outside of the hollow fibers in the bundles making up each sub-assembly.

This use of vanes, baffles or fins is generally described and claimed in copending application, U.S. Ser. No. 423,178 filed Oct. 18, 1989 in the names of R. C. Schucker, C. P. Darnell and M. M. Hafez, the disclosure of which is incorporated herein by reference. The manifold means need not be fitted to every element. Unmanifolded elements can be connected in series with central mandrels coupled to each other and collars fitted around adjoining ends to define fluid tight flow channels. The far opposite ends of these coupled modules would be manifolded to facilitate fluid introduction or collection into the final element.

Alternatively, each element can be manifolded with central mandrels' extending through the manifolds. These elements can be connected in series by coupling the central mandrels, in which case each set of manifold means on each element would function as staged fluid introduction or collective means, depending on the point at which feed is introduced into the element and the direction of feed flow. If feed is introduced into the element through one of the manifold means, the downstream manifold on one element can be coupled to the upstream manifold of the next element in series, with the central mandrels also being coupled, thereby producing an integral element of any desired length.

As previously stated the exterior vessel is fitted with entrance/exit means, the function being determined by the mode of operation of the element, and the ends are manifolded, if desired or necessary to define fluid entrance or exit collective means. The central mandrel pierces the manifold means and is not in fluid communication with the collection zones defined by said manifold means.

Thus, if feed is introduced into the element through the central perforated mandrel the opening in the exterior vessel wall would function as a feed/retentate exit means while the permeate is recovered from the interior of the hollow fibers by accumulation in the manifolds (also fitted with exit/entrance means) at the ends of the module.

In the fabrication of the final module the ends of the module, with the potted ends located at both ends of the assembly, are manifolded with the central mandrel extending through but not in fluid communication with the manifold. The central mandrel is not in direct fluid communication with the interior of the hollow fiber, the ends of which are capped by the manifold means. In the above described application the permeate accumulates in these manifold means which are in direct fluid communication with the interior of the hollow fiber and is recovered therefrom through fluid exit means in the manifold.

In an alternate mode of operation the feed is introduced into the element through one of the manifold means at one end of the module (upstream end). The feed passes through the interior of the hollow fibers and moves as feed/retentate to the manifold means at the downstream side of the module to be exhausted from the module into storage, into a subsequent membrane element for further separation or to a separate process. The permeate accumulates on the exterior of the hollow fiber under the influence of pressure or in response to a concentration gradient maintained by means of a sweep fluid (liquid or gas) in which case the process is described or perstraction, or in response to elevated temperature and a vacuum, in which case the process is described as pervaporation.

The permeate is removed from the vessel through the fluid exit/entrance means operating as an exit means in the vessel wall and/or through the central mandrel.

The module can be used under any of a number of operating conditions. If permeation is induced by means of an applied pressure the process is identified as ultrafiltration or reverse osmosis. Similarly the process conditions can be such that the process is perstraction or pervaporation, as previously described.

In fabricating a module the materials of construction will be dictated by the separation to be accomplished and the conditions used in the process employed.

Thus, high pressures and high temperature will mandate the use of robust materials such as metal or glass or carbon fiber reinforced high temperature resins in constructing the exterior vessel, manifolds and central mandrel. The adhesives used, as well as the membrane materials employed must also be able to withstand the environment to which they are exposed.

Typical adhesives used as the potting material will be epoxies or silicone adhesives. Some adhesives which can be used are described in U.S. Pat. No. 4,464,494 which describes epoxy adhesives useful for the production of elements employed in the separation of dewaxing solvents (such as methyl ethyl ketone/methyl isobutyl ketone) from dewaxed oil or in U.S. Pat. No. 4,582,726 which describes silicone adhesives used to produce elements used to recover extraction solvents (such as n-methyl pyrrolidone, phenol, furfural, etc.) from extract or raffinate oil.

Other adhesives can be used depending on the service in which the module is used and their selection is left to the practitioner.

The selection of the material out of which the hollow fiber is prepared is similarly left to the practitioner and also depends on the separation being practiced.

Typical membrane material includes regenerated cellulose, cellulose acetate, cellulose esters, cellulose ethers, polyvinyl alcohol, polybenzimidazol, polyurethane, polyurea/urethane, polysulfone, polyimide, polyurethane imide, polyisocyanates, etc.

For the separation of dewaxing solvent from oil, polyimide membranes can be used, as described in U.S. Pat. No. 4,532,041.

The separation of aromatics from non-aromatics can be accomplished using cellulose esters and ethers as described in U.S. Pat. No. 2,970,106. Practicing the separation under perstraction or pervaporation conditions can be accomplished using polyurethane membranes, described in U.S. Pat. No. 4,115,465 or a polyurea/urethane membrane described in copending application U.S. Ser. No. 108822, filed Oct. 14, 1987 in the name of Robert C. Schucker. That polyurea/urethane membrane is characterized by having a urea content of at least about 20% but less than 100% an aromatic carbon content of at least about 15 mole %, a functional group density of at least about 10 per 1000 grams of polymer, and a C=O/NH ratio of less than about 8.

U.S. patent application Ser. No. 108,821 filed Oct. 14, 1987 in the names of Feimer, Koenitzer and Schucker produces anisotropic membranes, preferably of the polyurea/urethane type described above, by synthesizing the polymer on a high boiling solvent which contains less than 5 vol % non solvent, producing hollow fiber on an appropriate backing and subjecting the film to conditions such that the solvent vapor pressure-time factor is about 1000 mm Hg—min or less after which the membrane is quenched in a non-solvent quenching medium. The membrane is a tri layer anisotropic membrane character by possessing 2 dense skin layers surrounding a porous core of the same material.

The present invention will be better understood by reference to the Figures which while illustrative of a preferred embodiment are not to be taken as limitations on the invention.

Figure 1A:
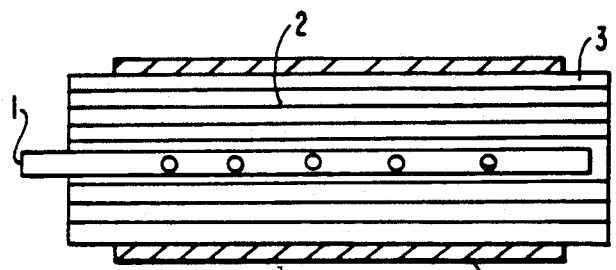
Figure 1B:
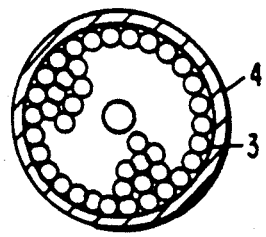

FIGS. 1, 1A and 1B show three schematic views of the central mandrel core sub assembly used in the present invention. A perforated mandrel (1) is surrounded by a bundle of hollow fibers (2) in a generally cylindrical form. The hollow fibers run parallel to the central mandrel. The ends of the bundle are potted with a collar/disc of potting material (3) which also contacts the central mandrel, which central mandrel extends beyond the collar on one end and is embedded in the potting material at the other. In practice this central mandrel can extend beyond both ends of the module thereby permitting a number of modules to be coupled in series. This sub assembly is wrapped with a mesh or permeable material wrap (4) which does not extend to the ends of the assembly.

Figure 2:
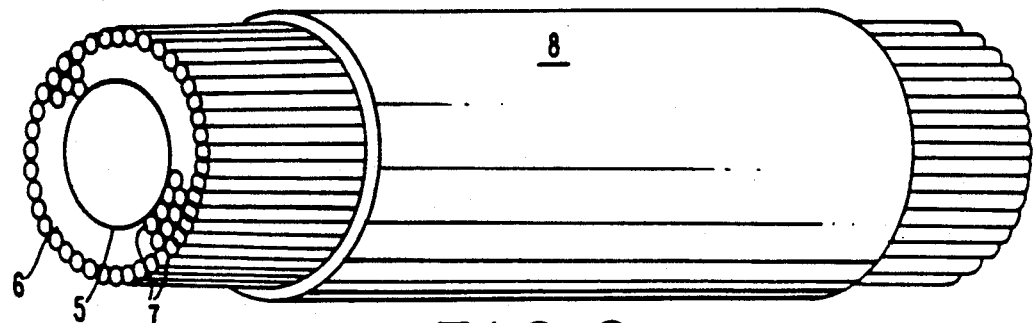
FIGS. 2, 2A and 2B are schematics in three views showing one large diameter cylinder sub assembly which fits around the central core assembly.
Figure 2B:
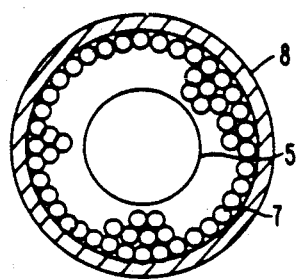
Figure 2A:
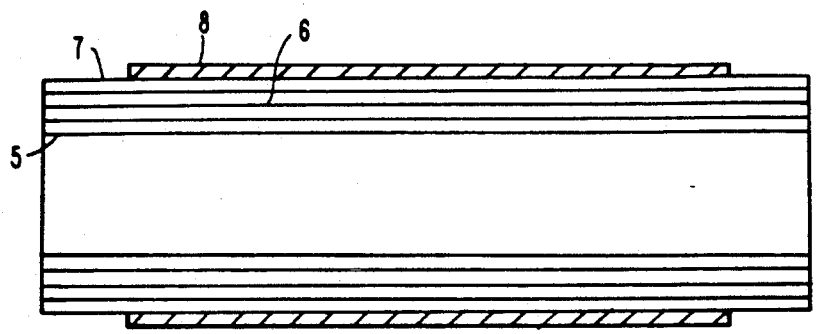

FIGS. 2, 2A and 2B show three schematic views of a concentric ring of hollow fibers into which the sub assembly of FIG. 1 is to be fitted. This large diameter concentric ring sub assembly is built up on a perforated or porous large diameter central tube (5) which is generally the same length as the assembly of FIG. 1. Hollow fibers (6) are laid parallel to this tube and the assembly is potted on the end. The potting (7) is on the exterior of the large diameter central tube and extends the depth of the hollow fiber bundle at the edges forming a collar/disc of potting material around the large diameter central tube. This sub assembly is similarly wrapped in mesh or permeable material (8) which does not extend to the edges of the assembly.

Figure 3:
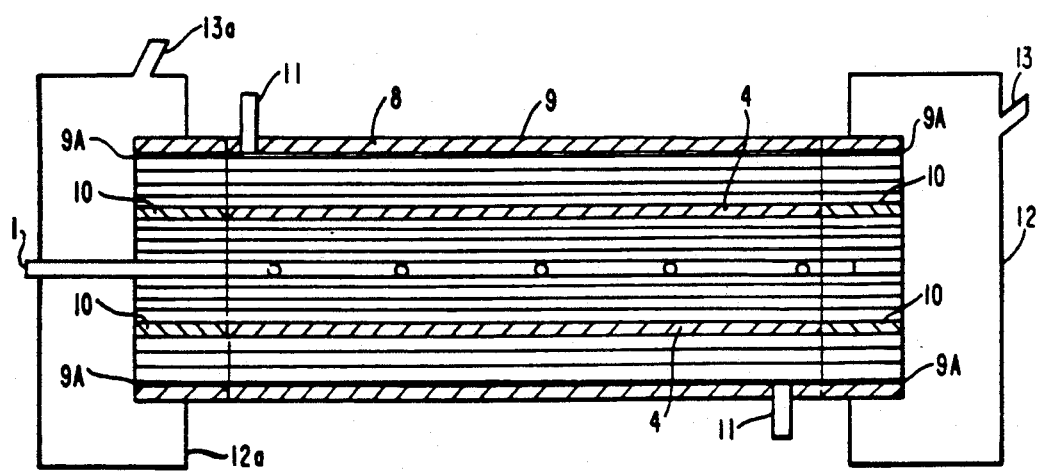
FIG. 3 is a schematic showing the large diameter cylinder sub assembly fitted around the central core assembly and the seam between the assemblies glued to form a large diameter element inside a manifold pressure vessel housing.

FIG. 3 shows the final module element wherein the sub assembly from FIG. 1 is inserted into the sub assembly from FIG. 2, the seams between the 2 potted collar/discs are glued (10) in the gap created by overwrap 4 which does not extend to the ends of the central sub assembly and the assembly inserted into an exterior vessel (9), glued to the interior bore of vessel (9) by a bead of glue at (9A) in the gap created by overwrap 8 which does not extend to the ends of the larger diameter sub assembly, vessel (9) being fitted with entrance/exit means (11). The final assembly in vessel (9) is manifolded at its ends by manifold (12) and (12a) which are both fitted with fluid exit/entrance means (13) and (13a). The central mandrel (1) passes through the manifold means and is not in direct fluid communication with the interior zone defined by the manifold means.

Depending on the service to which the final module will be placed and the method of operation employed it may be possible to omit the perforated central mandrel from the element during construction.

Thus, if feed is introduced into the module through the central mandrel (1), permeate will accumulate inside the hollow fibers and pass to the ends of the element to the manifold means for recovery therefrom through exit/entrance means (13) and (13a) functioning as exit means.

Retentate, remaining on the outside of the fibers, will exit the module through exit means (11). Obviously, flow can also be reversed with feed being introduced via entrance means (11) and retentate exiting via the central mandrel.

Conversely, if feed is introduced into the element in the interior of the hollow fibers at one end through manifold (12) and entrance means (13), the retentate will exit from the hollow fiber at the other end (manifold (12a) and exit means (13a)). The permeate, accumulating at the exterior surface of the hollow fiber would be recovered through exit means (11) and/or through the central mandrel. In this embodiment either exit means (11) or central mandrel (1) can be eliminated. Preferably both exit means (11) and the central mandrel (1) would be retained, especially in perstractive service as the sweep liquid or gas could be introduced in the element through one and the permeate/sweep recovered through the other. If both exit means (11) are retained sweep could be introduced into the element through one with permeate/sweep recovered through the other. In that case, the central mandrel could be eliminated. If only one exit/entrance means (11) is retained, than the central mandrel is necessary, serving as either the sweep entrance or the permeate/sweep exit means.

What is claimed is;

1. A hollow fiber module made by the method comprising fabricating a first, generally cylindrical central sub-assembly of hollow fibers, the ends of which sub-assembly are potted said potting forming circular collars at the ends of the first central sub-assembly, and a series of additional cylindrical sub-assemblies generally equal in length to the first central sub-assembly and to each other, each such sub-assembly being of increasing diameter and fitting around a next smaller cylindrical sub-assembly in the series and inside a next larger cylindrical sub-assembly in the series, each such sub-assembly comprising hollow fibers potted at the ends, said potting forming circular collars of potting, wherein the cylindrical sub-assemblies are fitted concentrically into each other according to size and around the first central sub-assembly, the entire array of concentrically assembled sub-assemblies being glued in the spaces between the circular collars of potting at the ends of each concentrically fitted cylindrical sub-assembly and the central sub-assembly to produce a complete hollow fiber module.

2. The hollow fiber module of claim 1 wherein the first, central sub assembly includes a perforated central mandrel around which the hollow fibers are bundled.

3. The hollow fiber module of claim 2 wherein the first, central sub assembly includes an overwrap of porous material, the overwrap not extending to the edges of the sub assembly.

4. The hollow fiber module of claim 1, 2 or 3 wherein the additional cylindrical sub assemblies include a central perforated or porous tube around which the hollow fibers are bundled, the central perforated tube of each additional cylindrical sub assembly being of an internal diameter to fit around the next smaller sub assembly or first central sub assembly.

5. The hollow fiber module of claim 4 wherein the additional cylindrical sub assemblies include an overwrap of porous material, the overwrap not extending to the edges of the sub assembly.

6. The hollow fiber module of claim 1 further comprising an exterior vessel into which the assembled sub assemblies are inserted and potted, said exterior vessel being equipped with fluid entrance and fluid exit means.

7. The hollow fiber module of claim 5 further comprising an exterior vessel into which the assembled sub assemblies are inserted and potted, said exterior vessel being equipped with fluid entrance and fluid exit means.

8. The hollow fiber module of claim 6 further comprising manifolds fitted at either end of the exterior vessel surrounding the assembled sub assemblies, said manifolds being equipped with fluid entrance and fluid exit means.

9. The hollow fiber module of claim 7 further comprising manifolds filled at either end of the exterior vessel surrounding the assembled sub assemblies, said manifolds being equipped with fluid entrance and fluid exit means.

* * * * *